United States Patent Office 3,079,407
Patented Feb. 26, 1963

3,079,407
16-TRIHALOMETHYL STEROIDS
Lewis H. Sarett, Princeton, Roger E. Beyler, Westfield, and Frances G. Hoffman, Newark, N.J., assignors to Merck & Co., Inc., Rahway, N.J., a corporation of New Jersey
No Drawing. Filed Aug. 28, 1959, Ser. No. 836,586
16 Claims. (Cl. 260—397.4)

This invention relates to steroids and particularly to 16-trihalomethyl steroids and to a process for producing such compounds.

Since the discovery of the remarkable properties of cortisone and hydrocortisone for the use in the therapy of arthritis and related diseases, there has been a widespread interest in finding derivatives of these compounds and other steroids which either have greater activity or which possess other desirable properties which would make them more adaptable to a wider range of uses and methods of administration. The anti-inflammatory, anti-allergic and antifibroplastic action of steroids is of such a complex nature that it is difficult to predict what substituents on the steroid nucleus will produce such activity.

The reaction of ketones with haloform to yield the corresponding trihalomethyl tertiary alcohol is known. The reaction of a ketone with bromoform can be illustrated as follows:

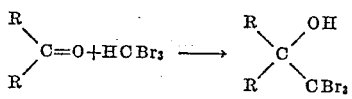

wherein R is an alkyl group.

The primary object of the invention is to produce 16-trihalomethyl steroids. Another object is to provide a simple and effective method for their production. A further object of the invention is to provide intermediates useful in the production of 16-substituted steroids and related compounds.

According to the present invention, it has been discovered that the reaction of haloform with $\Delta^{16}$-20-keto steroids results in formation of the corresponding 16-trihalomethyl-20-keto steroids. This reaction can be chemically represented, insofar as the change occurring in the D ring of the steroid nucleus is concerned, as follows:

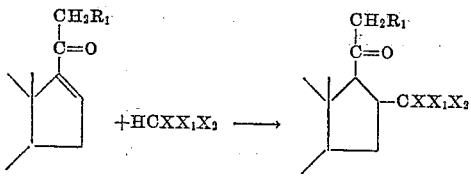

wherein X, $X_1$ and $X_2$ are halo groups, such as chloro, bromo, iodo and fluoro groups and $R_1$ is a hydrogen, hydroxy, or a hydrocarbon group such as acyloxy and alkyl groups. The hydrocarbon group conventionally contains up to eight carbon atoms.

The reaction of the $\Delta^{16}$-20-keto steroid with the haloform is preferably carried out in the presence of a strong base. The reaction takes place readily between 20° and 60° C., but higher and lower temperatures can be used. The reaction is usually completed in about 5 to 12 hours. Because of the nature of the reactants, greater control of the reaction can be maintained at lower temperatures. The reaction can be carried out by simple admixture of the reactants although it is preferred to use a solvent medium which is inert under the condition of the reaction. Any of the conventional solvents can be used, such as dimethoxymethane, dimethoxyethane, tetrahydrofuran and dioxane.

Typical examples of strong bases which can be used are alkali and alkaline earth metal alkoxides and hydroxides, alkali metal carbonates, and quaternary ammonium hydroxides. The alkoxides are preferably those containing from one to eight carbon atoms. Particular examples of strong bases are potassium-t-butoxide, sodium hydroxide, potassium hydroxide, tetramethyl ammonium hydroxide, tetraethyl ammonium hydroxide, methyltriethyl ammonium hydroxide, calcium isopropoxide, magnesium hydroxide, barium hydroxide, sodium carbonate, potassium carbonate, lithium carbonate. Conventionally, by the term strong base, is meant a substance which will exert a pH greater than about 10 when in an aqueous solution of one-tenth of one percent concentration.

Any of the $\Delta^{16}$-20-keto steroids may be converted to the corresponding 16-trihalomethyl-20-keto steroid. The $\Delta^{16}$-20-keto steroid compound can be saturated or unsaturated and may contain other substituents attached to the steroid molecule. Thus, the steroid nucleus may be unsaturated having ring double bonds such as at the 1:2, 4:5, 7:8 and/or 9:11 positions. In addition, nucleus substituents can be attached in the steroid nucleus at various positions, such as the 1, 3, 4, 6, 7, 11 and/or 12 position. Typical of the groups which can be attached to the steroid nucleus are halo, hydroxy, keto, alkyl and/or acyloxy groups. It is desirable in the case of keto substituents at some of the positions such as the 3 position to protect them in some manner during the reaction, such as by conversion to a dioxolane, to prevent reaction with the haloform. Other substituents can also be present at various positions in the molecule such as alkoxy, amino groups and the like. Typical examples of such compounds are pregnanes, allopregnanes, pregnenes, pregnadienes and other pregnanes having greater degrees of unsaturation. Typical examples of the compounds which can be produced in accordance with the invention are the 16-tribromomethyl, 16-trichloromethyl, 16-triiodomethyl and 16-trifluoromethyl derivatives of pregnane-3α-ol-11,20-dione 3-acetate; 5-pregnene-3α-ol-20-one 3-acetate; pregnene-3α,21-diol-20-one 3,21-diacetate; pregnane-3α-ol-20-one; 5-pregnene-3α-ol-20-one; pregnane-3α,11-diol-20-one; 5-pregnene-3α,11-diol-20-one; 1-pregnene-3α-ol-11,20-dione 3-acetate; allopregnane-3α-ol-11,20-dione 3-acetate; and allopregnane-3α-ol-20-one; pregnane-3α,21-diol-11,20-dione 3,21-diacetate; and 5-pregnene-3α,21-diol-20-one 3,21-diacetate. The acetate group in these compounds can be replaced by any of the other ester groups such as propionate, butyrate, benzoate, t-butyl-acetate, hemisuccinate and phenylacetate. The most useful of the compounds which can be prepared in accordance with the invention are those which can be prepared from readily available starting materials. This group of compounds can be represented by the following structural formula:

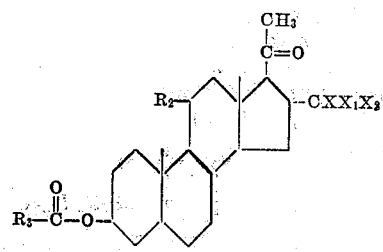

wherein $R_2$ is a keto, hydroxy or hydrogen group, $R_3$ is a hydrocarbon group containing up to eight carbon atoms such as alkyl and aralkyl, and X, $X_1$ and $X_2$ are halo groups which can be the same or different groups.

The 16-trihalomethyl derivatives of the invention can readily be converted to the corresponding 16-methyl derivatives by hydrogenation in ethanol in the presence of a Raney-nickel catalyst. Following the procedure described in J. Am. Chem. Soc. 80, p. 3160, the 16-methyl derivative can be converted to compounds having cortisone-like activity. In a like manner by following this procedure, the 16-trihalomethyl derivative can also be converted to compounds having cortisone-like activity such as 16-trichloromethyl cortisone and 16-triflouromethyl hydrocortisone. The compounds of the invention therefore represent valuable intermediates for the preparation of steroids having cortisone-like activity.

EXAMPLE I

16α-Tribromomethylpregnan-3α-Ol-11,20-Dione Acetate

One gram of 16-pregnen-3α-ol-11,20-dione 3-acetate was dissolved in 5 ml. of dimethoxyethane. This solution was stirred and 0.5 ml. bromoform and 300 mg. powdered potassium hydroxide were added. The reaction mixture was stirred at room temperature (22° C.) for 5 hours. The reaction mixture was then poured onto ice water which contained 4 ml. of concentrated sulfuric acid. This aqueous mixture was extracted with ethyl acetate, washed with water and a saturated solution of sodium bicarbonate, dried and evaporated in vacuo to give an oil. Chromatography of this oil on 20 g. of acid washed alumina yielded the crystalline product when the column was eluted with petroleum ether-ether (1:1).

EXAMPLE II

16α-Trichloromethylpregnenolone Acetate

One gram of 16-dehydropregnenolone acetate (5,16-pregnedien-3β-ol-20-one acetate) was dissolved in 5 ml of dimethoxyethane. The solution was stirred and 0.32 ml. of chloroform and 300 mg. of powdered potassium hydroxide were added. The reaction mixture was stirred for 5 hours at room temperature (22° C.) at which time it was poured onto ice which contained 4 ml. of concentrated sulfuric acid. This aqueous mixture was extracted with ethyl acetate, washed with a saturated solution of sodium bicarbonate, water, dried over magnesium sulfate and evaporated in vacuo to yield an oil. This oil was chromatographed on 10 g. of acid washed alumina. Elution of the column with petroleum ether-ether 1:4 gave crystals of 16α-trichloromethylpregnenolone acetate, M.P. 188–192° C., λmax. nujol 5.80, 5.88, 8.1 mu.

EXAMPLE III

16α-Trichloromethylpregnan-3α-Ol-11,20-Dione 3 Acetate

One gram of 16-pregnene-3α-ol-11,20-dione 3-acetate was dissolved in 5 ml. of dimethoxyethane. To this solution was added 0.32 ml. of chloroform and 300 mg. of powdered potassium hydroxide. The reaction mixture was stirred for six hours at room temperature at which time it was poured onto ice which contained 4 ml. of concentrated sulfuric acid. This aqueous mixture was extracted with ether and ethyl acetate. The organic layer was washed with water, dried over magnesium sulfate and evaporated in vacuo to yield an oil. This oil was chromatographed on 20 g. of acid-washed alumina. Elution of the column with petroleum ether-ether (6:4) yielded an oil which crystallized when treated with methanol-water to give 16α-trichloromethylpregnan-3α-ol-11,20-dione 3 acetate, M.P. 110–120° C., λmax. nujol 5.75, 5.80, 8.0 mu.

EXAMPLE IV

16α-Trichloromethylpregnan-3α-Ol-11,20-Dione

Thirty milligrams of 16-trichloromethyl pregnan-3α-ol-11,20-dione 3-acetate was dissolved in 5 ml. of methanol and 0.3 ml. conc. hydrochloric acid was added. The reaction mixture was allowed to stand at room temperature (22° C.) overnight. The mixture was then poured into water. The crystals obtained were centrifuged and washed with a saturated solution of sodium bicarbonate, water, and dried. They were then recrystallized from methanol-water to give 16α-trichloromethylpregnan-3α-ol-11,20-dione, M.P. 110–115° C. λmax. nujol 2.8,5.8 mu.

About 5 g. of 16α-trichloromethylpregnan-3α-ol-11,20-dione was mixed with 93 ml. of ethanol, 3 g. of potassium acetate, and 35 g. of Raney-nickel catalyst. The mixture was then saturated with hydrogen to yield 16α-methylpregnane-3α-ol-11,20-dione which can be converted to compounds having cortisone-like activity by the procedure in J. Am. Chem. Soc. 80, p. 3160.

Any departure from the above description which conforms to the present invention is intended to be included within the scope of the claims.

What is claimed is:

1. A process which comprises reacting a 3-oxygenated-Δ$^{16}$-20-keto steroid selected from the group consisting of pregnanes, allopregnanes and C-5 unsaturated pregnene compounds with haloform to produce the corresponding 16α-trihalomethyl-20-keto steroid, said 3-oxygenated groups being selected from the group consisting of hydroxy and lower acyloxy.

2. The process of claim 1 wherein the reaction is carried out in the presence of a strong base.

3. The process of claim 2 wherein the reaction is carried out in a solvent medium.

4. The process of claim 2 wherein a strong base is potassium hydroxide.

5. The process of claim 3 wherein the solvent is dimethoxyethane.

6. A process which comprises reacting a compound having the formula

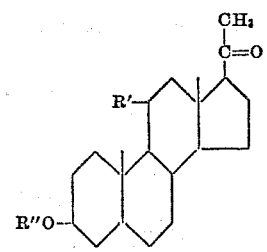

wherein R' is selected from the group consisting of hydrogen, keto and hydroxy and R'' is selected from the group consisting of hydrogen and

wherein R''' is a hydrocarbon group containing up to eight carbon atoms, with haloform to produce the corresponding 16α-trihalomethyl pregnane.

7. A process which comprises reacting a compound having the formula

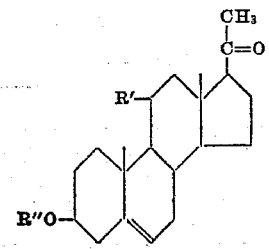

wherein R' is selected from the group consisting of hydrogen, keto and hydroxy and R'' is selected from the group consisting of hydrogen and

wherein R''' is a hydrocarbon group containing up to eight carbon atoms, with haloform to produce the corresponding 16α-trihalomethyl pregnene.

8. A process which comprises reacting 5,16-pregnadiene-3β-ol-20-one 3-acetate with chloroform in the presence of a strong base to produce 16α-trichloromethyl-5-pregnen-3β-ol-20-one 3-acetate.

9. A process which comprises reacting 16-pregnen-3α-ol-11,20-dione 3-acetate with bromoform to produce 16α-tribromopregnan-3α-ol-11,20-dione 3-acetate.

10. A 16α - trihalomethyl - 3 - oxygenated - 20 - keto - pregnane wherein the halo substituents are selected from the group consisting of bromo, chloro and fluoro groups and wherein the 3-oxygenated group is selected from the group consisting of hydroxy and lower acyloxy.

11. A 16α - trihalomethyl - 3 - oxygenated - 20 - keto - $\Delta^5$-pregnene wherein the halo substituents are selected from the group consisting of bromo, chloro and fluoro groups, and wherein the 3-oxygenated group is selected from the group consisting of hydroxy and lower acyloxy.

12. 16α - trichloromethylpregnan - 3α - ol - 11,20 - dione 3-acetate.

13. 16α- trichloromethyl 5 - pregnen - 3β - ol - 20 - one 3-acetate.

14. 16α -tribromomethylpregnan - 3α - ol - 11,20 - dione 3-acetate.

15. 16α - trichloromethylpregnan - 3α -ol - 11,20 - dione.

16. A compound selected from the group consisting of 16α-trihalomethyl-3-oxygenated-20-keto-pregnanes, 16α - trihalomethyl-3-oxygenated-20-keto-allopregnanes, 16α-trihalomethyl - 3 - oxygenated - 20 - keto - $\Delta^5$ - pregnenes and 16α-trihalomethyl-3-oxygenated-20-keto-$\Delta^{1,5}$-pregnadienes said 3-oxygenated groups being selected from the group consisting of hydroxy and lower acyloxy.

References Cited in the file of this patent

Fieser et al.: Steroids (1959), pages 941 and 942, Reinhold Publishing Company, N.Y.